United States Patent
Hung

(10) Patent No.: US 6,907,665 B2
(45) Date of Patent: Jun. 21, 2005

(54) METHOD OF MANUFACTURING ALLOY RIM FOR AUTOMOBILE

(75) Inventor: Frank Hung, Taipei (TW)

(73) Assignee: Rimtech Industrial Co., Ltd., Taipei Hsien (TW)

( * ) Notice: Subject to any disclaimer, the term of this patent is extended or adjusted under 35 U.S.C. 154(b) by 157 days.

(21) Appl. No.: 10/351,503

(22) Filed: Jan. 27, 2003

(65) Prior Publication Data

US 2004/0107576 A1 Jun. 10, 2004

(30) Foreign Application Priority Data

Dec. 10, 2002 (TW) ........................................ 91135622 A

(51) Int. Cl.$^7$ ................................................ B21K 1/38
(52) U.S. Cl. ................................ 29/894.353; 29/894.35
(58) Field of Search ..................... 29/894.353, 894.354, 29/894.351, 894.35; 72/307, 51, 415; 301/95.101

(56) References Cited

U.S. PATENT DOCUMENTS 6,519,852 B1 * 2/2003 Chen ..................... 29/894.353

FOREIGN PATENT DOCUMENTS

| JP | 356062639 | * | 5/1981 |
| JP | 2001088504 | * | 4/2001 |

* cited by examiner

Primary Examiner—John C. Hong
(74) Attorney, Agent, or Firm—Leong C. Lei

(57) ABSTRACT

A method of manufacturing alloy rim for automobile is disclosed. The method comprises the steps of forming elongated extruded alloy straps with a cross-section shape from alloy by an extruding process; cutting the extruded alloy into the required length; placing the cut alloy obtained in (b) onto a mold to form into an arch-shaped edge; cutting the two ends of the edges of the extruded alloy to form into an inclined angle end; placing the extruded alloy of (d) into a device to form the alloy into a round rim; welding the ends of the two joining ends; performing a surface hardening process; furnishing the rim that obtained in (g) with CNC lathe machine.

10 Claims, 10 Drawing Sheets

METHOD OF MANUFACTURING ALLOY RIM FOR AUTOMOBILE

BACKGROUND OF THE INVENTION (a) Technical Field of the Invention

The present invention relates to alloy rim, and in particular, to a method of manufacturing alloy rim for use in automobiles.

(b) Description of the Prior Art

Conventional methods for manufacturing of alloy rim are disclosed in U.S. Pat. Nos. 4,589,177 and 4,185,370. The U.S. Pat. No. 4,185,370 discloses an improved method of making vehicle wheel rims particularly suitable for use with materials having relatively low ductility, such as aluminum. A circumferential drop center well is formed about the periphery of the band and work hardened so that the well material exhibits higher strength and lower ductility than the remaining band material. The strength and ductility differential between the well and band material adjacent thereto assists in confining material movement in subsequent rim forming operations and induces drawing of the rim bead seat area material U.S. Pat. No. 4,589,177 discloses a method of manufacturing a wheel rim for a motor vehicle, including cutting off a section of an extruded cylindrical tube to produce a hollow cylindrical rim blank, and subjecting the blank to two successive deformation steps. During the first step, only the central section of the blank is deformed radially inwardly, the diameter of the end sections remaining substantially unchanged. In the second step, only the edge portions of each end section are deformed radially outwardly, so that the region between each edge portion and the central section is unchanged in diameter. Also, the outermost part of each edge of the blank is bent into a U-shape. The rim is then gauged to finish it. The first deformation step is performed by a pair of cooperating rollers having central sections shaped to deform the central section of the blank. The end sections of the rollers are spaced apart to accommodate the end sections of the blank, the spaces being open at the sides of the rollers to permit free endwise flow of the rim blank outwardly from between the rollers.

The drawbacks of these methods are that a plurality of different shape rollers and molding devices have to be employed in order to produce the required cross-sectional shape of the alloy rim. As a result, the process of manufacturing is slow and laborious and the cost of production is high.

Another drawback of the conventional method is that the density of the material used for alloy plate is low and in the course of roller pressing on the alloy plate, the force distribution may not even and therefore the size of bubble on the surface of the alloy is large, and if a high speed tire is fitted onto the alloy rim, air leakage may occur when the tire is pumped with a high pressure.

Accordingly, it is an object of the present invention to provide a method of manufacturing alloy rim for automobile, which mitigates the above drawbacks.

SUMMARY OF THE INVENTION

Accordingly, it is an object of the present invention to provide a method of manufacturing an alloy rim comprising the steps of forming elongated extruded alloy straps with a cross-section shape from alloy by an extruding process; cutting the extruded alloy into the required length; placing the cut alloy obtained in (b) onto a mold to form into an arch-shaped edge; cutting the two ends of the edges of the extruded alloy to form into an inclined angle end; placing the extruded alloy of (d) into a device to form the alloy into a round rim; welding the ends of the two joining ends; performing a surface hardening process; furnishing the rim that obtained in (g) with CNC lathe machine.

Yet another object of the present invention is to provide a method of manufacturing alloy rim for automobiles, wherein after the alloy is pressed to form a circular rim, a mold is used to rapidly form a rim and the mold is provided with a moving center and two semicircular moving molds, the mold rapidly pressed the circular rim to obtain a precise alloy rim of the present invention.

Still another object of the present invention is to provide a method of manufacturing alloy rim for automobile, wherein the top mold in step (c) disclosed above is provided with an impact face having a cavity similar to the cross-section of the extruded alloy, and the bottom mold is provided with an impact face having a protruded block similar to the cross-section of the extruded alloy.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention.

Various changes to the described embodiments may be made in the function and arrangement of the elements described without departing from the scope of the invention as set forth in the appended claims.

Figure 1:
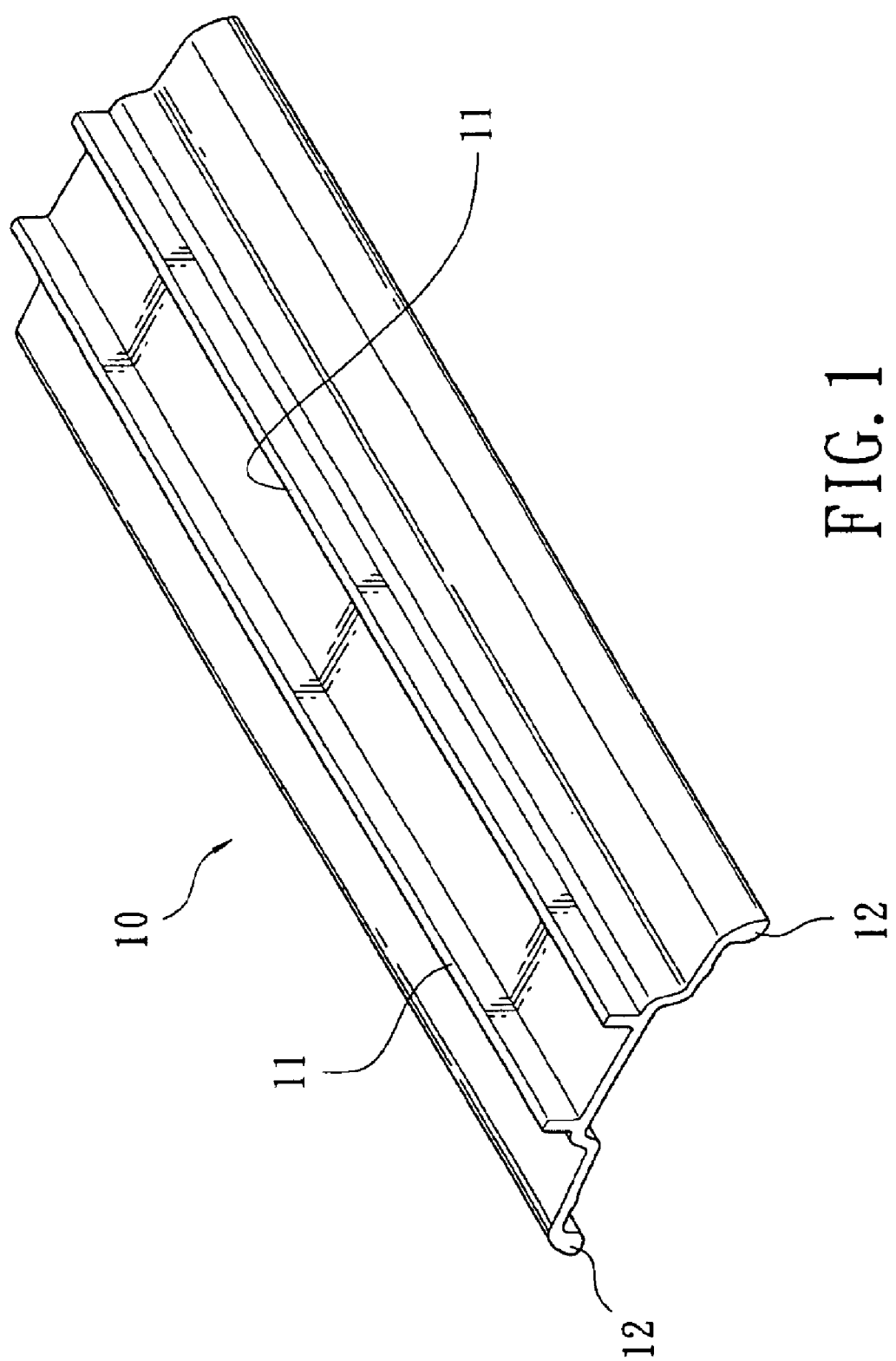
FIG. 1 is a perspective view of extruded alloy strap of the present invention.

Referring to FIG. 1, there is shown alloy for the manufacturing of rim for use in automobiles. In accordance with the present method, a specific length of the extruded alloy plate 10 is cut, and a rib 11 and a lid edge 12 are provided to the alloy plate 10. In the present invention, two lines rib structure 11 is formed.

Figure 2:
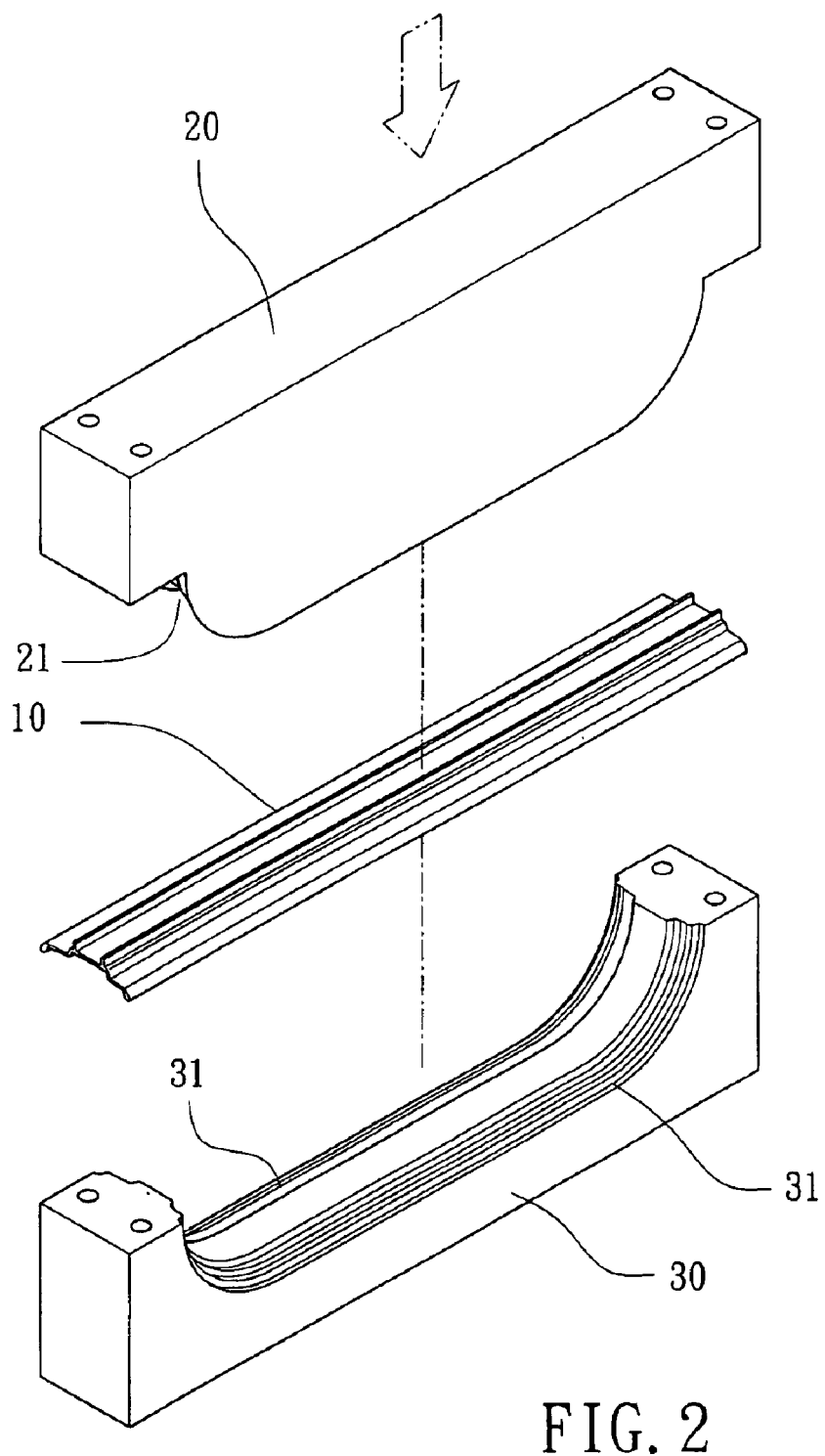
FIG. 2 is a schematic view showing the bending of a flat alloy of the present invention.
Figure 3:
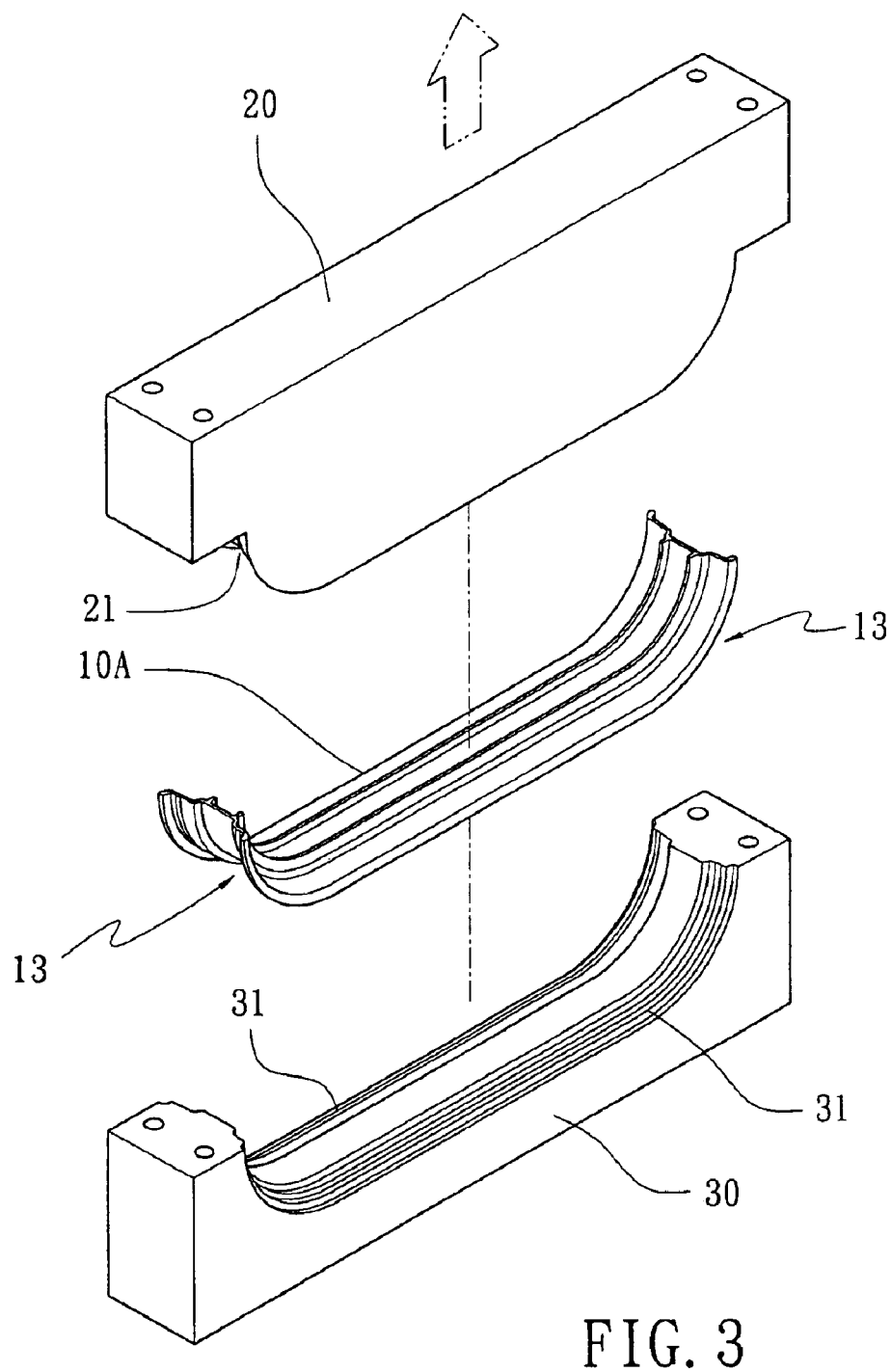
FIG. 3 is a schematic view showing the formation of the bent alloy in accordance with the present invention.

As shown in FIGS. 2 and 3, a specific cut length of extruded alloy plate 10 is placed between a top mold 20 and a bottom mold 30. The impact face 20 of the top mold 20 has a cavity 21 similar to the cross-section of the extruded alloy plate 10, and the bottom mold 30 has an impact face having a protruded block 31 similar to the cross-section of the extruded alloy plate 10. By employing a stamping process, the two ends of the plate 10 are bent upward to form an arched edge 13, forming into a shaped alloy plate 10A.

Figure 4:
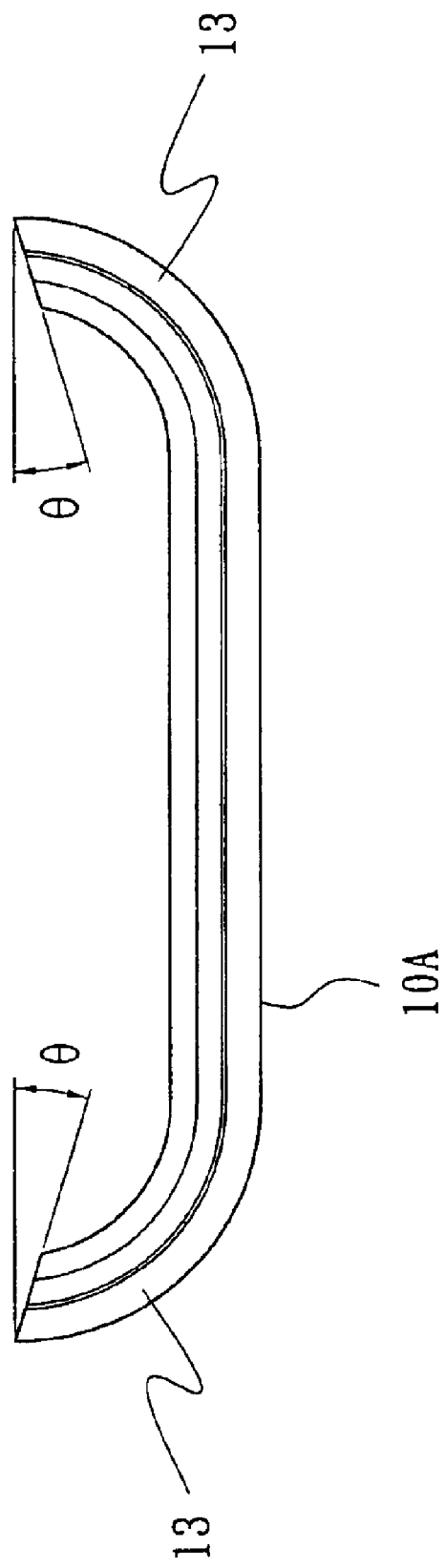
FIG. 4 is a schematic view showing the two ends of the alloy plate body being cut into edges with an inclined angle.

Referring to FIG. 4, the plate 10A is cut so that the cross-section of the plate 10A is provided with an inclined angle. This angle depends on the diameter of the rim that required. When the plate 10A is to be cut to form a circular shaped body, the plate 10A is cut to provide a parallel edge end for welding.

Figure 5:
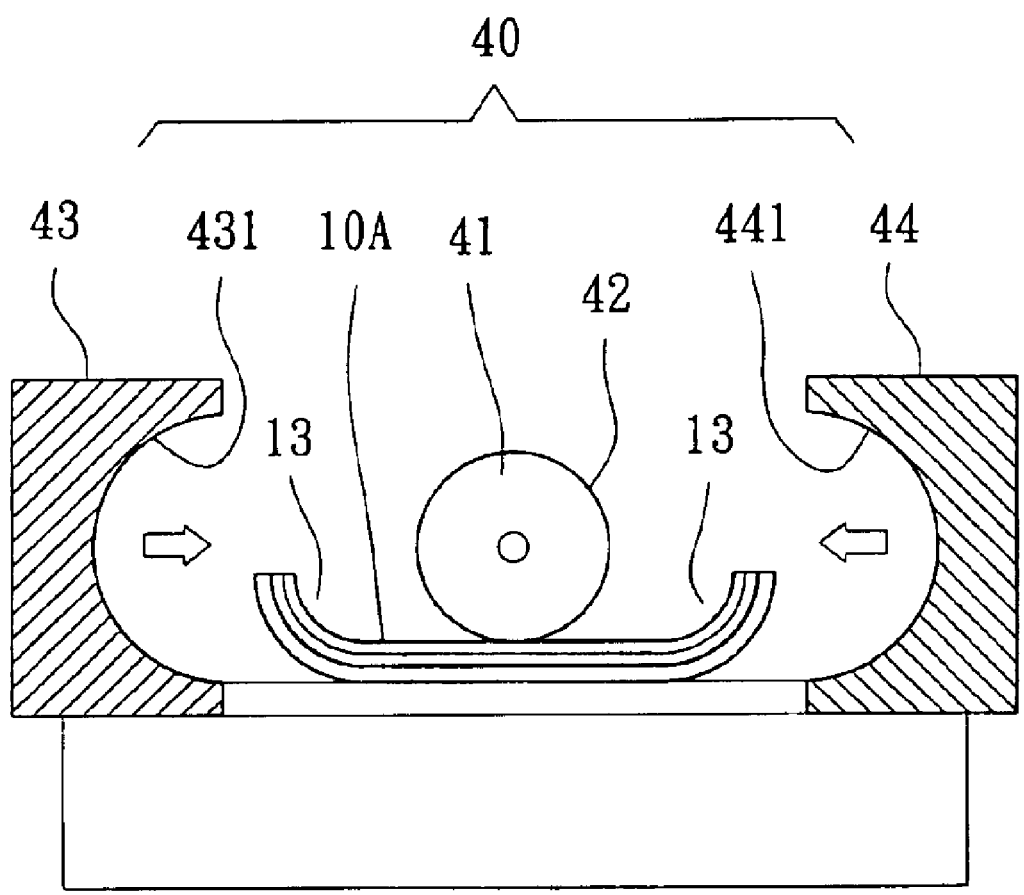
FIG. 5 is a schematic view showing the bent alloy being formed into a circular shape in accordance with the present invention.

Referring to FIG. 5, the plate 10A is placed within a moving mold 40 having a core molding block 41 with a circular profile 42 which can be lowered onto the plate 10A. The mold 40 is further provided with a left molding block 43 and a right molding block 44 at the side thereof which are controlled hydraulically.

The left molding block 43 has a semi-circular arch-shaped face 431, and the right molding block 44 has a semi-circular arch-shaped face 441. The surface of the semi-circular arch face 431 and 441 are provided with a cavity or protruding shape similar to the cross-section of the plate 10A. When the two molding blocks move toward each other and the molding block 41 is used as a center, the plate 10A will be compressed to form a circular shape.

Figure 6:
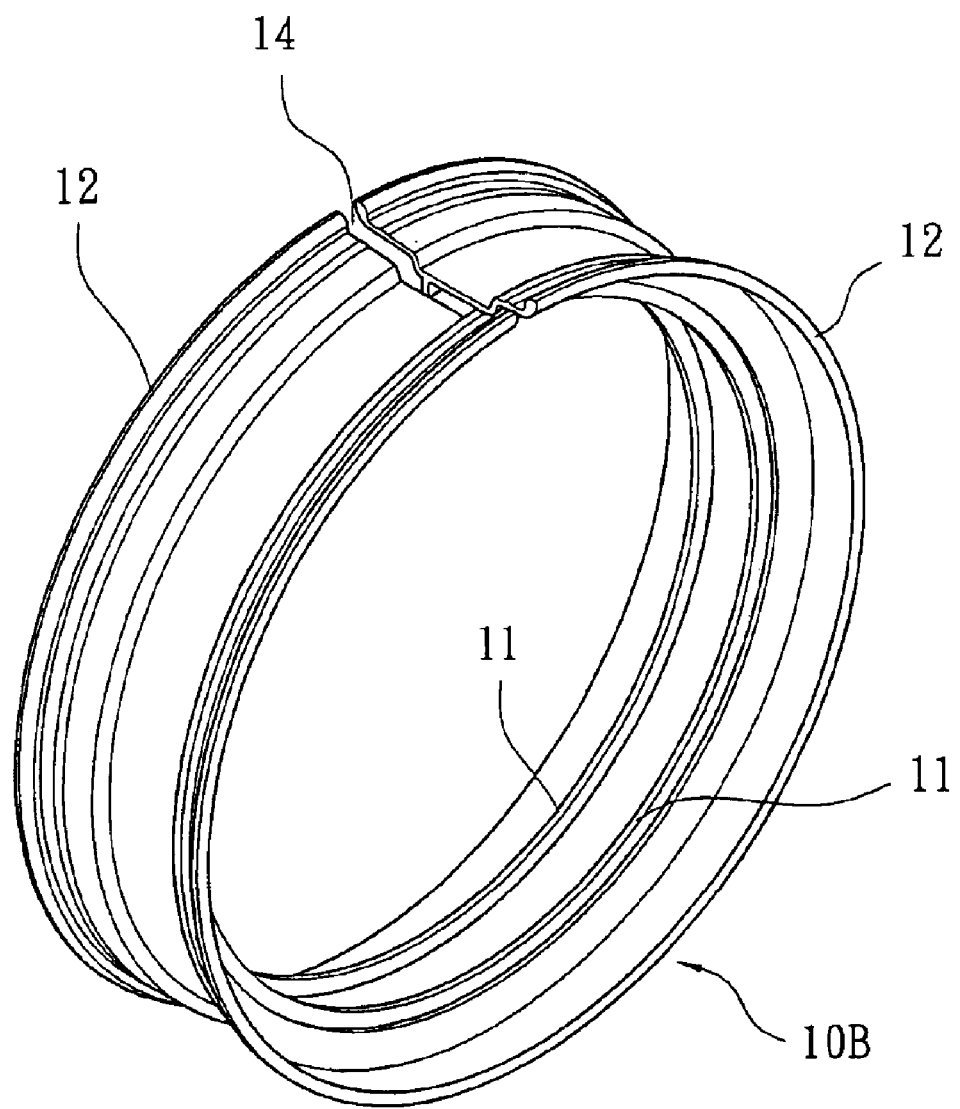
FIG. 6 is a perspective view showing the circular alloy rim in accordance with the present invention.
Figure 7:
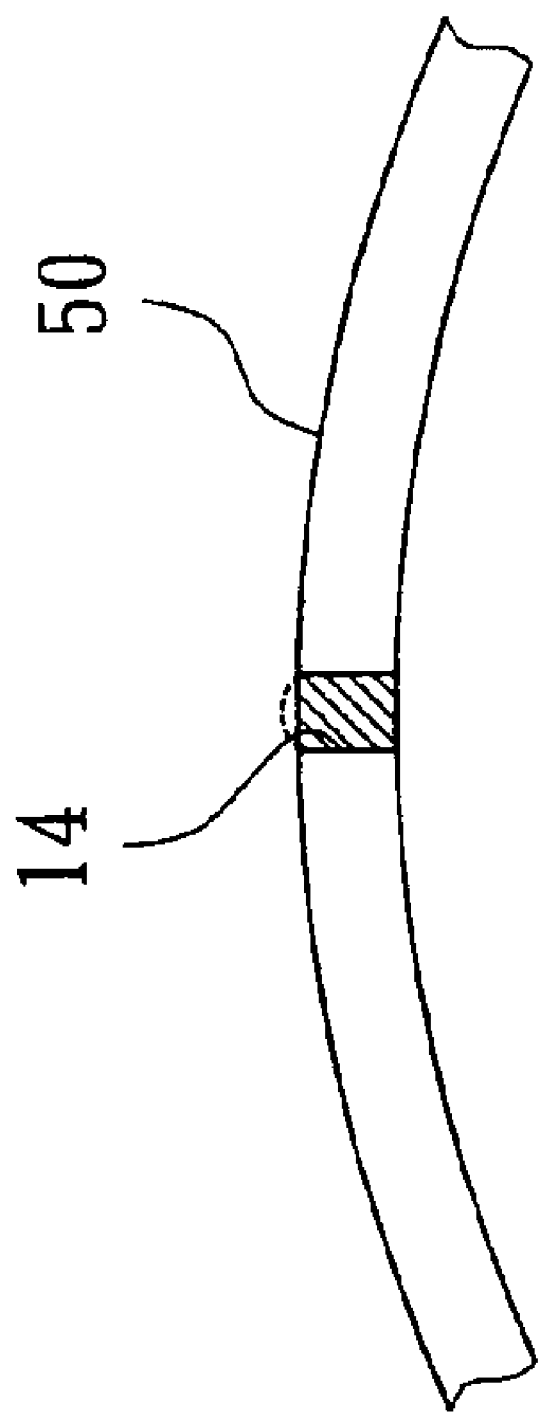
FIG. 7 is a schematic view showing the ends of the circular alloy, prior to forming into a rim, being a welded slit in accordance with the present invention.

As shown in FIG. 6, when the plate 10A is compressed to form a circular rim 10B, the ends of the plate 10A form into a gap 14. The cross-section of the gap 14 has parallel edges. The inclined angle of the ends of the plate 10A has to be taken into consideration in the course of cutting the plate 10A so that in the compression process, the gap 14 has similar thickness so as to proceed to a welding process (as shown in FIG. 6). After that, a CNC lathe machine is used to polish the welded surface. A T4 or T6 surface hardening treatment can be performed so as to accomplish the manufacturing of the rim.

Figure 8:
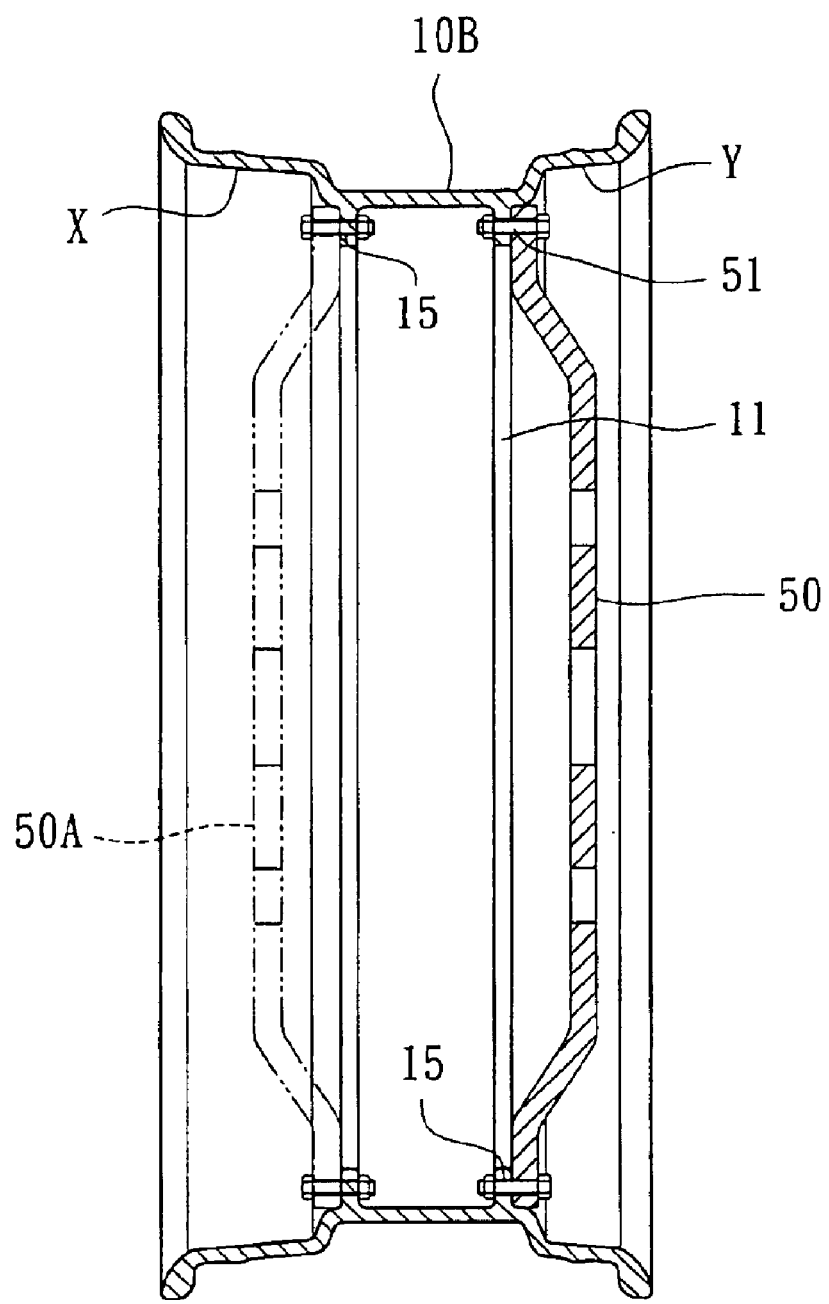
FIG. 8 is a schematic view of the alloy rim having mounted with a disk in accordance with the present invention.
Figure 8A:
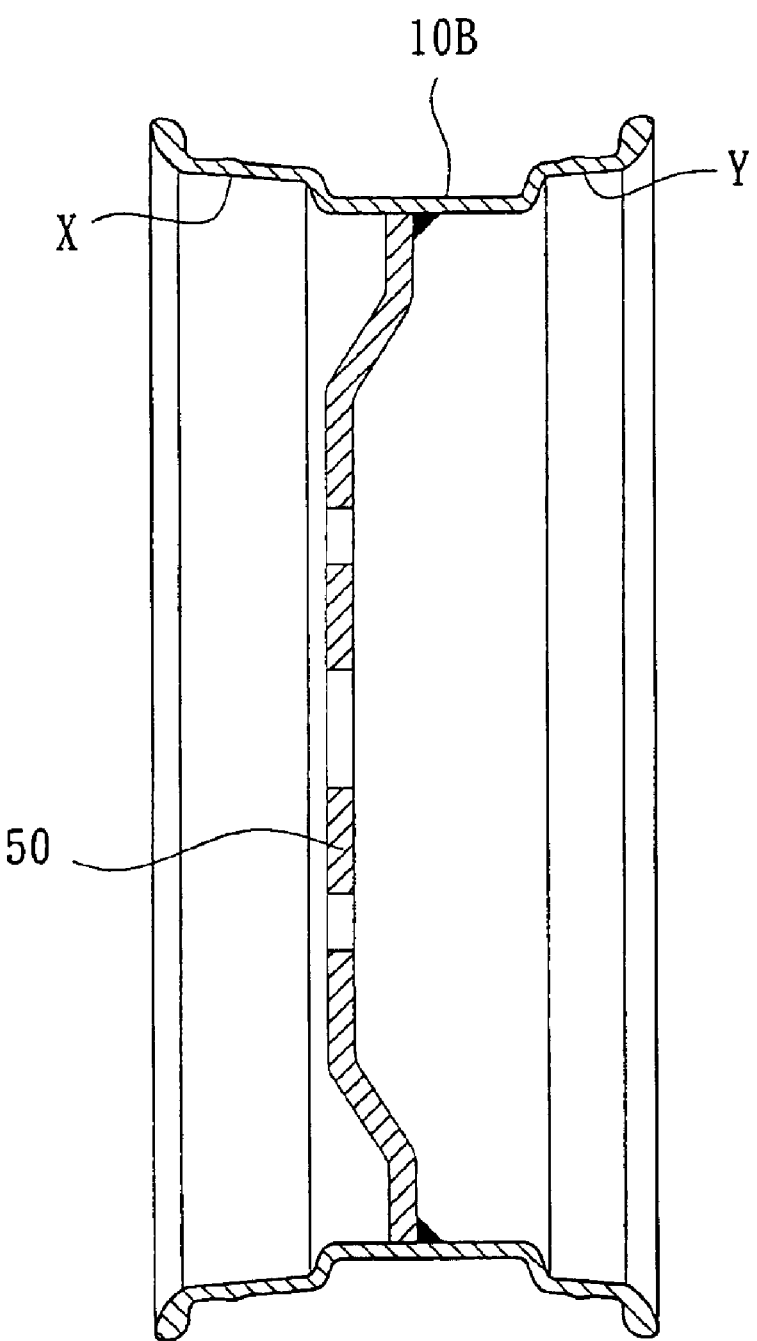
FIG. 8A is another preferred embodiment of the present invention, showing the welding of the rim and a disk.

Referring to FIG. 8, a plurality of symmetrical screw holes 15 are provided on the rib 11 of the rim 10B, and the circumferential edge of a disc 50 with ornamental design is provided with screw holes for the mounting with screw fastener 51 passed through the screw hole so that the disc 50 and the rim 10B are screwed to form one unit. If the rim does not provide with a rib, the disc has to be mounted at an appropriate position within the interior of the rim so that a complete rim (as shown in FIG. 8A) is obtained.

Figure 9:
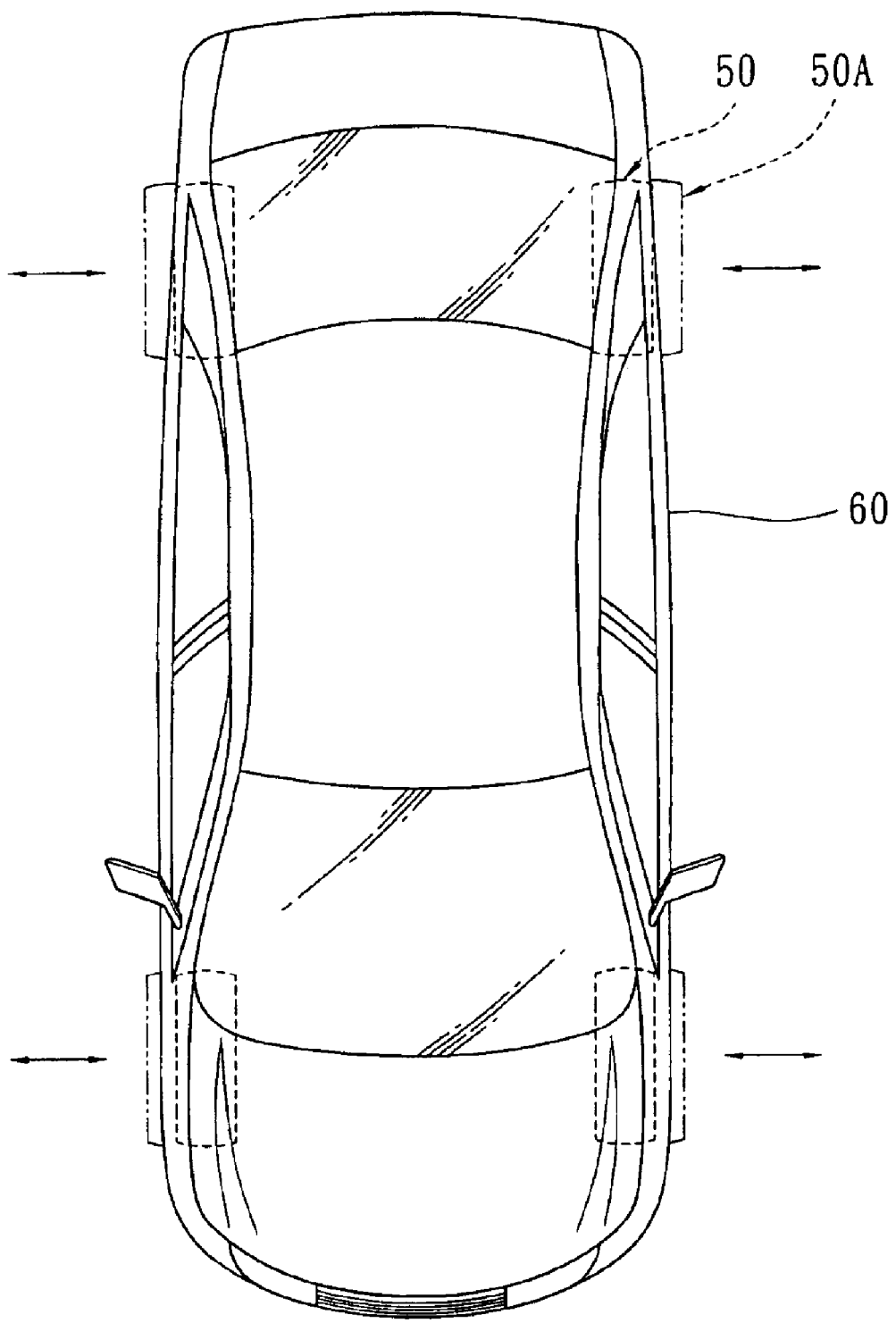
FIG. 9 is a schematic view showing the alloy rim being fitted to a vehicle in accordance with the present invention.

Referring to FIGS. 8 and 9, the mounting of disc 50 can either be externally mounting or internally mounting. In order to provide a longer wheel distance, the disc 50A is locked at the rim 10B close to the longer side X of the extended section so that when the disc 50A is locked to the wheel hub, the positioning distance of the tire is further separated. On the other hand, if the disc 50 is locked to the rim 10B close to the shorter side Y of the extended section, so that when the disc 50 is locked to the wheel hub, the distance of the tire position is nearer.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method of manufacturing an alloy rim comprising the steps of:
   (a) forming elongated extruded alloy straps with a cross-section shape from alloy by an extruding process;
   (b) cutting the extruded alloy into the required length;
   (c) placing the cut alloy obtained in (b) onto a mold to form into an arch-shaped edge;
   (d) cutting two ends of edges of the extruded alloy to form into an inclined angle end;
   (e) placing the extruded alloy of (d) into a device to form the alloy into a round rim;
   (f) welding the two ends;
   (g) performing a surface hardening process; and
   (h) furnishing the rim that obtained in (g) with CNC lathe machine.

2. The method of claim 1, wherein the extruded alloy for fabrication in step (a) is provided with a rib.

3. The method of claim 2, wherein the rib is in a single line structure.

4. The method of claim 2, wherein the rib is a dual line structure.

5. The method of claim 2, wherein the rib is drilled with screw hole for mounting with a disc using a screw fastener to form a rim.

6. The method of claim 1, wherein the extruded alloy is provided with a lid edge.

7. The method of claim 1, wherein a top mold in step (c) is provided with an impact face having a cavity similar to the cross-section of the extruded alloy, and a bottom mold is provided with an impact face having a protruded block similar to the cross-section of the extruded alloy.

8. The method of claim 1, wherein two moveable molding blocks in step (e) has an arch-shaped surface.

9. The method of claim 1, wherein the inner rim face of the alloy rim is welded with a disc to integrally form an alloy rim.

10. A method of manufacturing an alloy rim comprising the steps of:
   (i) forming elongated extruded alloy straps with a cross-section shape from alloy by an extruding process;
   (j) cutting the extruded ahoy into required length;
   (k) placing the cut alloy obtained in (b) onto a mold to form into an arch-shaped edge;
   (l) cutting two ends of edges of the extruded alloy to form into an inclined angle end;
   (m) placing the extruded alloy of (d) into a device to form the alloy into a round rim;
   (n) welding the two ends; and
   (o) furnishing the rim that obtained with CNC lathe machine.

* * * * *